United States Patent [19]

McArthur et al.

[11] 4,193,178

[45] Mar. 18, 1980

[54] COATING ROLLER

[75] Inventors: Alexander D. McArthur, Oakville; Robert J. Holsgrove, Georgetown; Gerard Hodge, Brampton, all of Canada

[73] Assignee: Persista, Inc., Brampton, Canada

[21] Appl. No.: 907,123

[22] Filed: May 18, 1978

[51] Int. Cl.[2] .......................... B21B 31/08; B60B 7/02

[52] U.S. Cl. .................................. 29/129.5; 101/415.1

[58] Field of Search ...................... 29/125, 129.5, 118, 29/119, 132; 101/415.1, 378

[56] References Cited

U.S. PATENT DOCUMENTS

| | | | |
|---|---|---|---|
| 1,827,300 | 10/1931 | Pritchard et al. | 101/415.1 |
| 2,965,024 | 12/1960 | Ziebell | 101/378 |
| 3,631,801 | 1/1972 | Luehrs | 101/378 |
| 3,765,329 | 10/1973 | Kirkpatrick et al. | 29/118 X |
| 4,006,686 | 2/1977 | Ackerman | 101/415.1 |
| 4,061,087 | 12/1977 | Hill | 101/415.1 |

FOREIGN PATENT DOCUMENTS

| | | | |
|---|---|---|---|
| 2036490 | 1/1972 | Fed. Rep. of Germany | 101/415.1 |

*Primary Examiner*—Wayne L. Shedd

*Attorney, Agent, or Firm*—Cullen, Sloman, Cantor, Grauer, Scott & Rutherford

[57] ABSTRACT

A coating roller having a cylindrical drum with a replaceable cover formed of a sheet metal substrate upon which is bonded a resilient plastic outer surface layer. A pair of closely spaced, parallel, longitudinally extending rigid strips are positioned upon the drum surface and fastened at their opposite ends to the drum ends for short distance sidewise movement towards and away from each other upon the drum surface. The drum surface, except for the area covered by and between the strips, is coated with an even thickness layer of a substantially incompressable, resilient, elastomeric material upon which the cover substrate is wrapped. The ends of the substrate are formed to engage with their adjacent strips so that movement of the strips towards each other locks the cover upon the drum and reverse movement permits disengagement of the cover ends from the strips for removal of the cover.

8 Claims, 9 Drawing Figures

FIG. 1
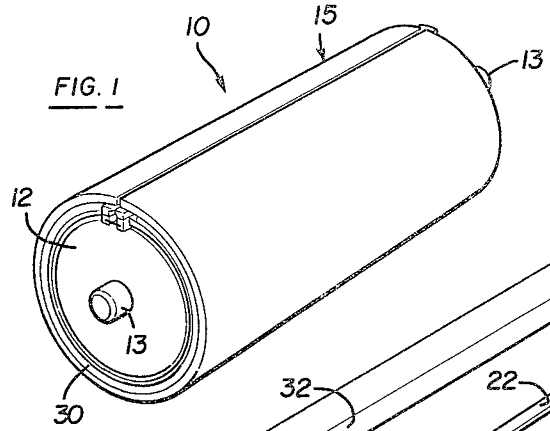
FIG. 2
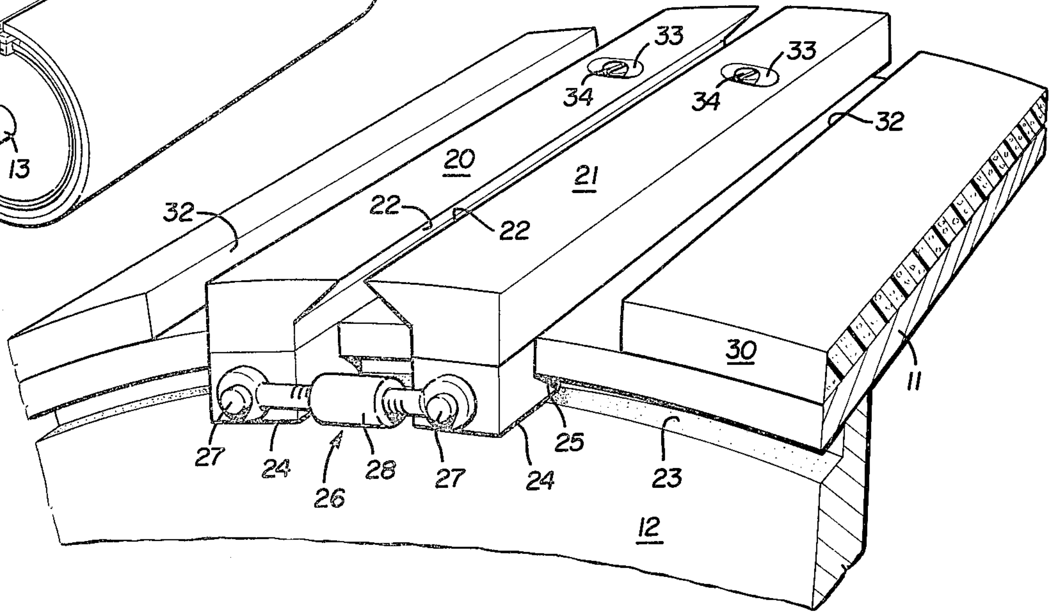
FIG. 3
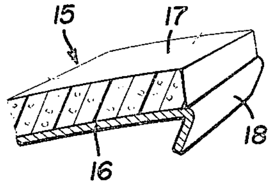
FIG. 4
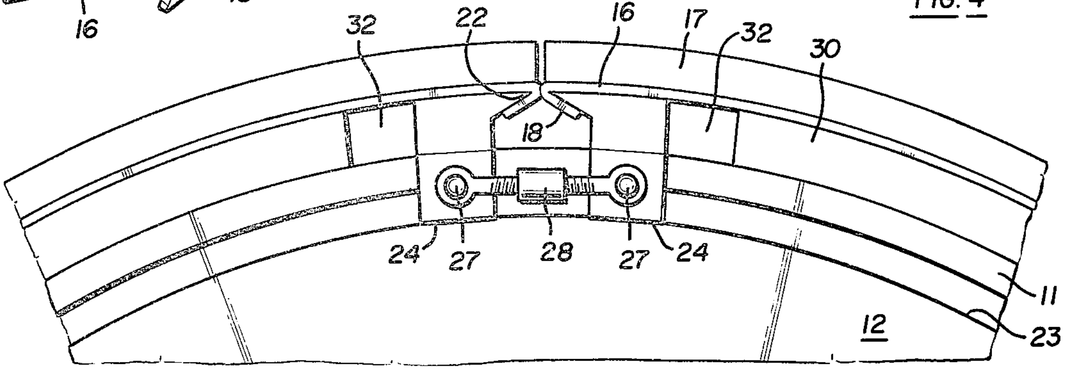
FIG. 7
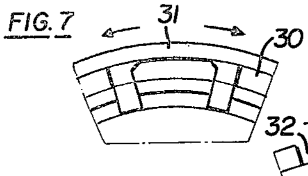
FIG. 8
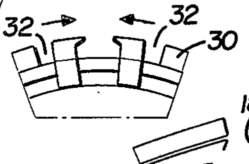
FIG. 5
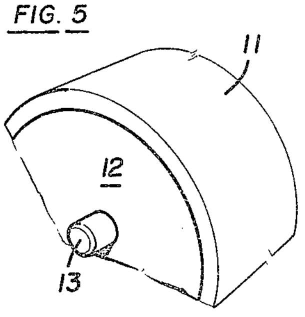
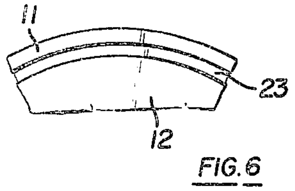
FIG. 6
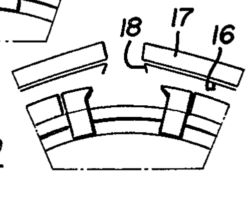
FIG. 9

COATING ROLLER

BACKGROUND OF INVENTION

In the manufacturing of metal cans out of aluminum or steel sheets or the like, it is a common practice to coat one surface of the sheet with a paint-like coating before cutting and processing the sheet into can sizes and shapes. Usually such coating is applied by means of a large coating roller which is about 15" in diameter and to 4' in length. Usually the outer surface of the cylinder is covered with a resilient, plastic layer that operates as the coating applying surface.

Coating rollers of the above described and similar types are usually made by first forming a metal cylindrically shaped drum and then casting or molding a plastic layer upon the surface of the drum. The plastic layer must be of uniform thickness and concentricity relative to the drum surface and axis in order to assure uniformity of coating. Thus, it must be carefully applied, properly sized and when worn, must be replaced or reconstructed.

Thus, efforts have been made to utilize a replaceable covering, sometimes called a "blanket" which can be replaced, when worn, with a fresh covering. This sort of replaceable covering is found in rollers used for other purposes, but which have a similar structure to rollers used for applying coatings upon metal sheet.

In order to assure continuous production in an manufacturing facility, it is desirable to be able to exchange the surface of the roller with a fresh surface by removing and replacing the coating or "blanket" rapidly and in a manner which assures uniformity of diameter and concentricity.

Rollers utilizing bonded surfaces must be replaced in their entirety with a fresh roller and the old roller must be cleaned and re-coated so that a considerable amount of time is required for this purpose. Most importantly, a production line might have to be shut down for some while in order to remove and replace a complete roller.

Efforts to use a separate blanket or coating on rollers involved systems for applying and fastening the covers to the rollers which were not accurate and were relatively expensive. In addition, if a replaceable cover is to be used in an existing manufacturing facility, such as in a mill where sheet steel or sheet aluminum is being processed for aluminum cans, it is desirable to utilize the already existing rollers available because of the substantial expense involved in replacing rollers.

Hence, the invention herein is concerned with an improved manner for covering a coating roller with a removable blanket or cover wherein an existing roller can be utilized and can be modified by relatively inexpensive additions for use in receiving and supporting a removable cover. This construction also is useful for other rollers, such as lithographic types of rollers, die cutting back-up rollers and the like.

SUMMARY OF INVENTION

The invention herein contemplates beginning with an existing roller drum such as is normally used in a coating line as described above, and applying to the drum a pair of parallel strips or bars which extend longitudinally of the drum and are closely spaced together in parallelism to the drum axis. The opposite ends of the strips or bars extend beyond the ends of the drum and are connected to the drum by means of simple guide blocks which permit the strips to be moved sidewise, i.e., along the circumference of the drum, towards and away from each other. The cover which is perferably formed with a sheet metal substrate upon which is bonded a thick layer of a resilient plastic material, may be wrapped around the drum and its opposite ends may be bent into hook-like formations for engaging with the strips so that the strips may be moved towards each other for tightening the cover around the drum or alternatively the strips may be moved apart for loosening and then releasing the covering from the drum.

The invention further contemplates utilizing a relatively thick, non-compressible elastomeric layer coating the drum in all areas except where the strips are located so that the cover or blanket is wrapped around this elastomeric layer which, because of its non-compressible characteristic, operates almost like a fluid, to uniformly locate the coating with respect to the drum radius and to uniformly distribute the pressure between the cover and the drum and vice versa.

That is, the invention herein contemplates utilizing a rigid drum coated with what amounts to a non-compressible elastomeric substance so that when the blanket is wrapped around the drum, it self centers relative to the drum axis to form a uniform diameter and accurate concentricity and longitudinal positioning with equalized load distribution. The interengagement between the opposite ends of the blanket and the connection means, i.e., the movable strips, produces a tangential tightening force upon the blanket which force is translated into uniform, radially inwardly directed pressures upon the drum because of the elastomeric layer.

An object of the invention, as can be seen from the above, is to be able to utilize existing rollers and by modifying them by adding the strips and strip connections and the elastomeric covering, the drum may be utilized repeatedly with replaced covers to thereby substantially reduce the time and effort required for replacement of worn coating applying surfaces and to materially reduce the cost of making and maintaining coating rollers and the like.

Further descriptions of this type of rollers and an alternative method and apparatus devised for this general purpose, is found in co-pending application Ser. No. 844,227 filed Oct. 21, 1977 by Gerard Hodge and Robert J. Holsgrove, now U.S. Pat. No. 4,110,882.

These and other objects and advantages of this invention will become apparent upon reading the following description, of which the attached drawings form a part.

DESCRIPTION OF DRAWINGS

FIG. 1 is a perspective view of the coating roller herein with the cover applied.

FIG. 2 is an enlarged, perspective view of a fragment of the roller drum and the strips for fastening the blanket thereto.

FIG. 3 is a fragmentary, perspective view of an end of the blanket or cover.

FIG. 4 is an enlarged, fragmentary end view of the opposite ends of the blanket secured upon the drum.

FIG. 5 is a fragmentary view of a pre-existing drum.

FIG. 6 shows the step of forming a groove in the drum end.

FIG. 7 is a fragmentary view illustrating the step of applying the elastomeric layer to the drum surface.

FIG. 8 illustrates the step of moving the strips inwardly away from the elastomeric layer.

FIG. 9 illustrates the steps of applying the opposite ends of the cover to the drum.

DETAILED DESCRIPTION

FIG. 1 illustrates a coating roller generally designated as 10, which comprises a cylindrical drum 11 having end closure plates 12 and support stub shafts 13, or bearings or the like, for mounting the drum for operation. The drum itself is essentially a metal cylinder of a conventional construction.

The roller includes a separate blanket or cover 15 which is formed of a sheet metal substrate 16 which is of sufficient length to wrap around the periphery of the roller. Bonded to the substrate is a plastic cover layer 17 such as of a suitable cast polyurethane material which is of a formulation suitable to act as a coating surface or for whatever purpose the roller may be used.

The opposite ends of the substrate are bent into end hook portions or bends 18 or alternatively, a separate hook-like configuration may be secured thereto.

The means for fastening the cover upon the drum includes a pair of parallel strips or bars 20 and 21 which are formed with beveled nose or edge portions 22 which oppose each other. These strips are laid loosely upon the surface of the drum, extending longitudinally of the drum, that is, in parallelism with the drum axis and with each other and are of a length so that their opposite ends extend beyond the ends of the drum.

A groove 23 is cut into the opposite ends of the drum, such as in the end plates 12, and a block is arranged at the opposite ends of each of the strips. These blocks 24 each include a leg 25 which slideably fits within the respective groove 23. The blocks are fastened to the ends of the strips, such as by screws or the like (not shown). Thus, the strips are slideable towards and away from each other. In order to move the strips, a turnbuckle 26 is arranged at each of the opposing ends of the strips and fastened to anchor pins 27 secured on the blocks or on the ends of the strips. A tightening nut 28 on each turnbuckle permits the turnbuckle to be shortened or lengthened, as is conventional, to thereby draw the strips towards and away from each other.

The exterior surface or exposed surface of the drum, excluding the area which is covered by the strips or over which the strips move, and the area between the strips, is covered with a relatively thick layer of a non-compressible elastomeric material, such as polyurethane. The layer 30 is bonded to the drum surface and preferably may be applied thereto by casting it directly upon the drum.

In order to apply the elastomeric material to the drum surface, the strips are spread apart to the farthest reach of their desired spacing and then the drum may be surrounded by an external circular shell which provides a space between the interior wall of the shell and the outer wall of the drum. Then the elastomeric material may be poured into the space for curing in situ so that it is bonded to the drum. The external shell may then be removed. The shell 31 is schematically illustrated in FIG. 7.

After the elastomeric material cures, the shell 31 may be removed and then the strips may be moved inwardly towards each other so that they are close together, thereby leaving a gap 32 between the outer edges of the strips and adjacent layer. The layer itself should be about the same thickness, as the thickness of the strips, measured in the radial direction of the drum.

Since the strips are relatively long, in order to better hold them in position against the drum, the strips may be provided with recessed or countersunk slots 33 through which screws 34 are extended for threadedly engaging with the surface of the drum. Thus, they serve as additional guides for guiding the strips and holding the middles of the strips closer against the drum against possible warping away therefrom.

In operation, a conventional coating drum (see FIG. 5) may be first cleaned of its usual bonded surface coating layer. Then, the grooves 23 may be cut in the end plates or ends of the drums (see FIG. 6). Next, the strips are placed upon the drum, the guide blocks are inserted into the grooves and screwed to the ends of the strips and then the turnbuckles are applied. Thereafter, the strips are separated as widely as possible, and the outer shell 31 is applied (see FIG. 7) and the elastomeric layer is cast. Next, the shell is removed, the strips may be moved inwardly somewhat to provide the gaps 32 and the drum is ready for use with a separable cover.

FIG. 9 illustrates the cover being applied to the drum. The strip ends 18 are hooked over the nose or edge portions 22 of the strips, after which the turnbuckles may be adjusted to draw the strips together. As the strips move together, they apply tangential forces to the ends of the cover which forces are translated into radially directed forces that are uniformly spread through the elastomeric material which acts like a non-compressible fluid for smoothing, self-centering and equalizing the force applied to the cover. FIG. 4 illustrates the strips arranged close together with the cover or blanket applied and held in place, ready for use as a coating roller or the like.

The non-compressible elastomeric material may vary depending upon what is commercially available and the cost thereof. An example of such a suitable material is a polyurethane identified as Dupont L-100, a polyurethane pre-polymer to which Dupont "MOCA" curing agent is added. "MOCA" is the trademark for methylene bis 2 ortho chloroaniline. 88% of L-100, by weight, is mixed with 12% of the "MOCA" and cured for about 5 minutes at about 220 degrees F. under vacuum. This is a known, commercially available material.

An example, of a useful material for the cover layer 17 is a polyester urethane pre-polymer with an added compatible plasticizer to formulate for about 50 Durometer Shore A. Other commercially available polymers and curing agents may be used depending upon desired finish surfaces.

Having fully described an operative embodiment of this invention, I now claim:

1. In a roller formed of a cylindrical drum around which is wrapped a removable cover, the improvement comprising;

a pair of closely spaced apart, narrow, elongated strips arranged upon the outer circumferential surface of the drum and extending substantially parallel to the drum axis;

means securing said strips to the drum, with at least one of the strips being movable sideways, i.e., circumferentially of the drum, upon the drum surface;

means for releaseably interconnecting each of the opposite ends of the cover to its adjacent strip, so that movement of said one strip towards the other exerts a tangential pull upon the cover to cause the cover to tightly envelop the drum;

and a relatively thick layer of a substantially non-compressible, resilient elastomeric material secured to the larger area of the drum surface exposed between the strips, that is, the area of the peripheral surface of the drum excluding the area covered by the strips and the close space between them;

said layer of elastomeric material being between said drum and said cover and the tangential pull on the cover against said layer causes the cover to substantially uniformly surround and press radially inwardly against the layer, said layer acting like a non-compressible fluid for equalizing any forces applied to said cover, and causing movement of the elastomeric layer to correspond to the inner surface of the cover for thereby self-centering the cover.

2. In a roller as defined in claim 1, and including said non-compressible layer being approximately as thick as the strips, measured radially of the drum.

3. In a roller as defined in claim 1, and said strips having inner edges facing towards each other, which edges are formed in a roughly beveled, wedge-like shape with their pointed edge portions directly opposing each other;

and said cover being formed of a sheet metal substrate coated with a thick resilient outer layer, with the edges of the opposite ends of the substrate being formed into hook-like configurations for hooking over said strip edge portions for thereby engaging the sheet with the strips.

4. In a roller formed of a cylindrical drum around which is wrapped a removable cover, the improvement comprising;

a pair of closely spaced apart, narrow, elongated strips arranged upon the outer circumferential surface of the drum and extending substantially parallel to the drum axis;

means securing said strips to the drum, with at least one of the strips being movable sideways, i.e., circumferentially of the drum, upon the drum surface;

means for releaseably interconnecting each of the opposite ends of the cover to its adjacent strip, so that movement of said one strip towards the other exerts a tangential pull upon the cover to cause the cover to tightly envelop the drum;

and a relatively thick layer of a substantially non-compressible, resilient elastomeric material secured to the larger area of the drum surface exposed between the strips, that is, the area of the peripheral surface of the drum which excludes the area covered by the strips and the close space between them;

said strips extending beyond the opposite ends of the drum and outer edge blocks attached to each of the strip ends and engaging guide means formed on the ends of the drum for thereby slideably mounting at least one of the strips upon the drum and otherwise securing the ends of the strips to the drum;

whereby the tangential pull on the cover causes the cover to substantially uniformly surround and press against the layer, and causing movement of the elastomeric layer to correspond to the inner surface of the cover for thereby self-centering the cover.

5. A construction as defined in claim 4, and said guide means including a groove formed in each of the opposite ends of the drum adjacent the peripheral surface thereof and each of said blocks having extension portions engaging within its respective groove for thereby guiding the block relative to the drum end.

6. A construction as defined in claim 4, and including means interconnecting the adjacent ends of the strips for moving said strip ends towards and away from each other and holding them in pre-determined locations and with both of said strps being movable towards and away from each other upon operation of said means.

7. A method for making a roller from a cylindrical drum around which is wrapped a removable cover, comprising:

applying a pair of narrow strips upon the surface of and extending longitudinally of the drum, with the strips being parallel to each other and spaced apart a short distance;

fastening the strips to the drum for sidewise movement of at least one of the strips along the circumferential surface of the drum;

applying a relatively thick surface covering layer of a substantially incompressible elastomeric material upon the drum surface with said layer being of a thickness approximately the same as the thickness of the strips measured radially of the drum, and the layer extending around the drum circumference from one strip to the other, but with the drum area covered by the strips and the short distance between the strips being uncoated;

whereby the cover may be wrapped around the drum surface such that the covering layer is between the cover and the drum and the opposite edges of the cover may be secured to the strips and pulled tangentially towards each other by moving the strips sidewise relatively towards each other, thereby moving each strip laterally away from its initial contact with its adjacent layer edge, said layer acting like a non-compressible fluid for equalizing any forces applied to said cover, and causing movement of the elastomeric layer to correspond to the inner surface of the cover for thereby self-centering the cover.

8. A method for making a roller from a cylindrical drum around which is wrapped a removable cover, comprising:

applying a pair of narrow strips upon the surface of and extending longitudinally of the drum, with the strips being parallel to each other and spaced apart a short distance;

fastening the strips to the drum for sidewise movement of at least one of the strips along the circumferential surface of the drum;

applying a relatively thick surface covering layer of a substantially incompressible elastomeric material upon the drum surface with said layer being of a thickness approximately the same as the thickness of the strips measured radially of the drum, and the layer extending around the drum circumference from one strip to the other, but with the drum area covered by the strips and the short distance between the strips being uncoated;

forming a groove-like formation in each end of the drum near the circumferential edge thereof;

and arranging a guide means in cooperative engagement with said formations for slideable movement of the guide means generally parallel to the circumference of the drum;

and securing the opposite ends of the strips to the respective guide means;

and adjusting the position of the guide means to thereby space the strips a short distance away from each other for applying the surface covering layer and for moving the strips towards each other when the cover ends are secured thereto for tightening the cover around the layer;

whereby the cover may be wrapped around the drum surface covered layer and the opposite edges of the cover may be secured to the strips and pulled tangentially towards each other by moving the strips sidewise relatively towards each other, thereby moving each strip laterally away from its initial contact with its adjacent layer edge, and causing movement of the elastomeric layer to correspond to the inner surface of the cover for thereby self-centering the cover.

* * * * *